United States Patent [19]

Stickle

[11] 3,928,638

[45] Dec. 23, 1975

[54] METHOD OF MAKING TACO SHELLS

[76] Inventor: Daniel T. Stickle, 310 E. 40th St., Lubbock, Tex. 79404

[22] Filed: Aug. 20, 1973

[21] Appl. No.: 390,164

Related U.S. Application Data

[62] Division of Ser. No. 222,493, Feb. 1, 1972, Pat. No. 3,785,273.

[52] U.S. Cl. ................................ 426/439; 426/138
[51] Int. Cl.² ......................................... A21D 10/00
[58] Field of Search ........... 426/439, 347, 343, 345, 426/145; 99/404, 443 C

[56] References Cited
UNITED STATES PATENTS

| | | | |
|---|---|---|---|
| 3,570,393 | 3/1971 | Schy | 99/404 |
| 3,602,130 | 8/1971 | Perez | 99/404 |
| 3,667,372 | 6/1972 | Hulvitz | 99/404 |
| 3,722,400 | 3/1973 | Jimenez | 99/404 |

*Primary Examiner*—Raymond N. Jones
*Attorney, Agent, or Firm*—Christie, Parker & Hale

[57] ABSTRACT

Tortillas are placed on a flexible, pliable, perforated web made of woven metal. A plunger folds over the tortilla, folding the tortilla and the metal web, and the combination wherein the tortilla is fried crisp in the folded position, thus forming it into a taco shell. Thereafter, the plunger with the taco shell theron is unfolded from the metal web and the fat drained and shaken from the shell and the shell dropped from the plunger.

1 Claim, 6 Drawing Figures

METHOD OF MAKING TACO SHELLS

CROSS-REFERENCE TO RELATED APPLICATIONS

This is a division of my previously filed patent application Ser. No. 222,493 which was filed on Feb. 1, 1972, now U.S. Pat. No. 3,785,273.

BACKGROUND OF THE INVENTION

1. Field of the Invention

This invention relates to a cooking apparatus of a deep-fat type with a conveyor, including a plural food molding support with a final elevated draining position.

2. Description of the Prior Art

A popular Mexican food is the taco. The taco is made by folding and frying a tortilla and then filling the taco shell with meat, cheese, vegetables, sauces, etc., according to taste and the availability of ingredients.

Taco shells were originally made by hand somewhat as described by POMPA, U.S. Pat. No. 2,570,374. POMPA discloses a simple frame for forming and frying a plurality of taco shells at a time.

SAENZ, U.S. Pat. No. 2,603,143, discloses a machine for forming and frying the shell as it moves through a machine. As applicant understands the SAENZ disclosure, the shell is formed by pulling it through a throat while it is still plastic or pliable.

YEPIS, U.S. Pat. No. 3,267,836, discloses a plurality of individual V-shaped molds of rigid character wherein the tortilla is folded thereover to form the taco shell.

In both SAENZ and YEPIS, the tortillas are carried by a chain conveyor through a deep-fat frying vat.

SCHY, U.S. Pat. No. 3,570,393, discloses dual sets of rigid plates mounted on chain conveyors which form the taco by folding the plates with the tortilla between them.

PEREZ, U.S. Pat. No. 3,602,130, discloses a plurality of rigid plates mounted on chain conveyors which move from a W-shape to a V-shape to form the taco.

SANTILLAN, U.S. Pat. No. 2,112,309; CONTRERAS, U.S. Pat. No. 2,773,442; and HAYES, U.S. Pat. No. 3,467,029, also are of interest.

SUMMARY OF THE INVENTION

1. New and Different Function

This invention forms the taco shell from the tortilla by having the tortilla placed upon the flexible, pliable web made of woven wire, and then folding the web with the tortilla thereon over a plunger to shape the tortilla. After the tortilla is formed, it is fried, then taken from the hot grease and flipped off the plunger to be packed.

2. Objects of the Invention

An object of this invention is to fry a crisp, edible product.

Another object is to form and fry a taco shell.

Another object is to drain all excess grease from the fried taco shell.

Further objects are to achieve the above with a method that is versatile, rapid, efficient, and inexpensive, and does not require skilled people to adjust, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 6 is a longitudinal sectional view of the unloading portion of the machine.

DESCRIPTION OF THE PREFERRED EMBODIMENT

Figure 3:
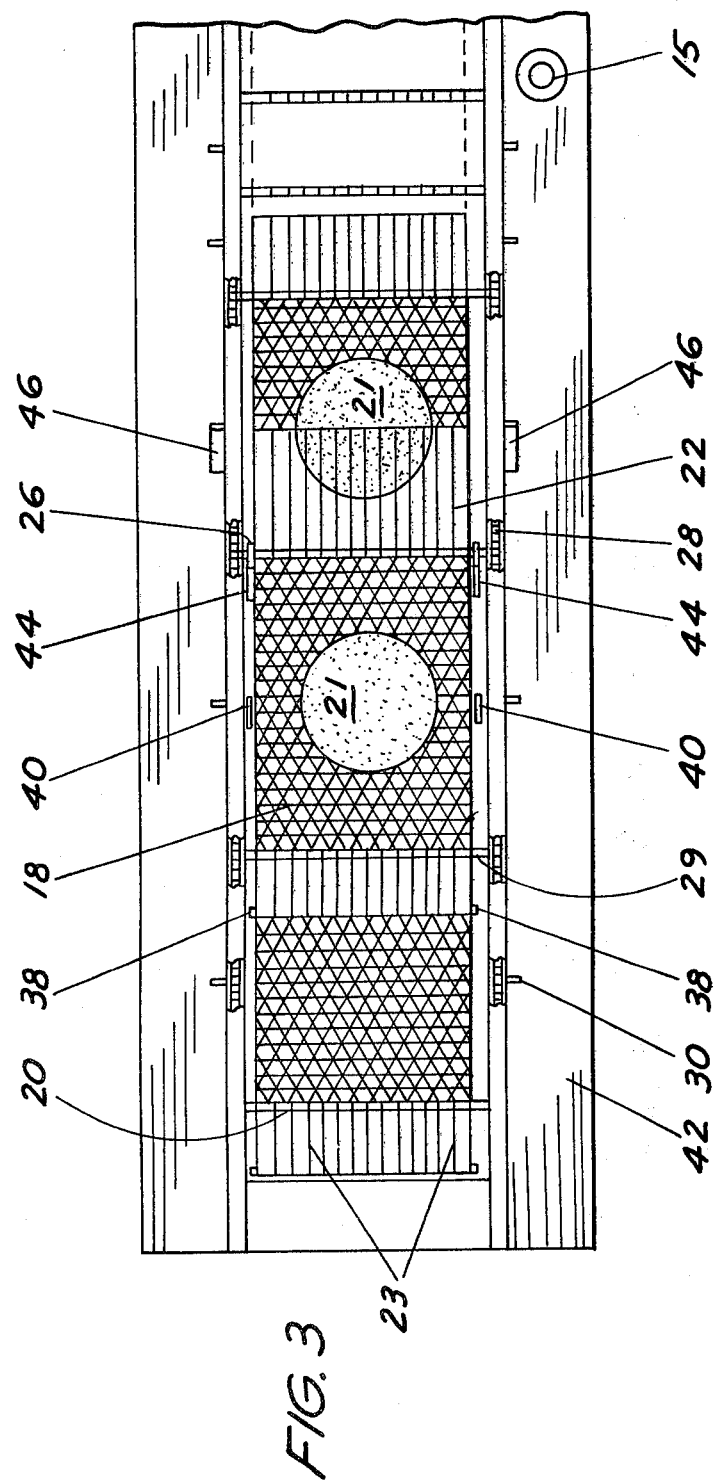
FIG. 3 is a top elevational view of the loading portion of the machine.
Figure 5:
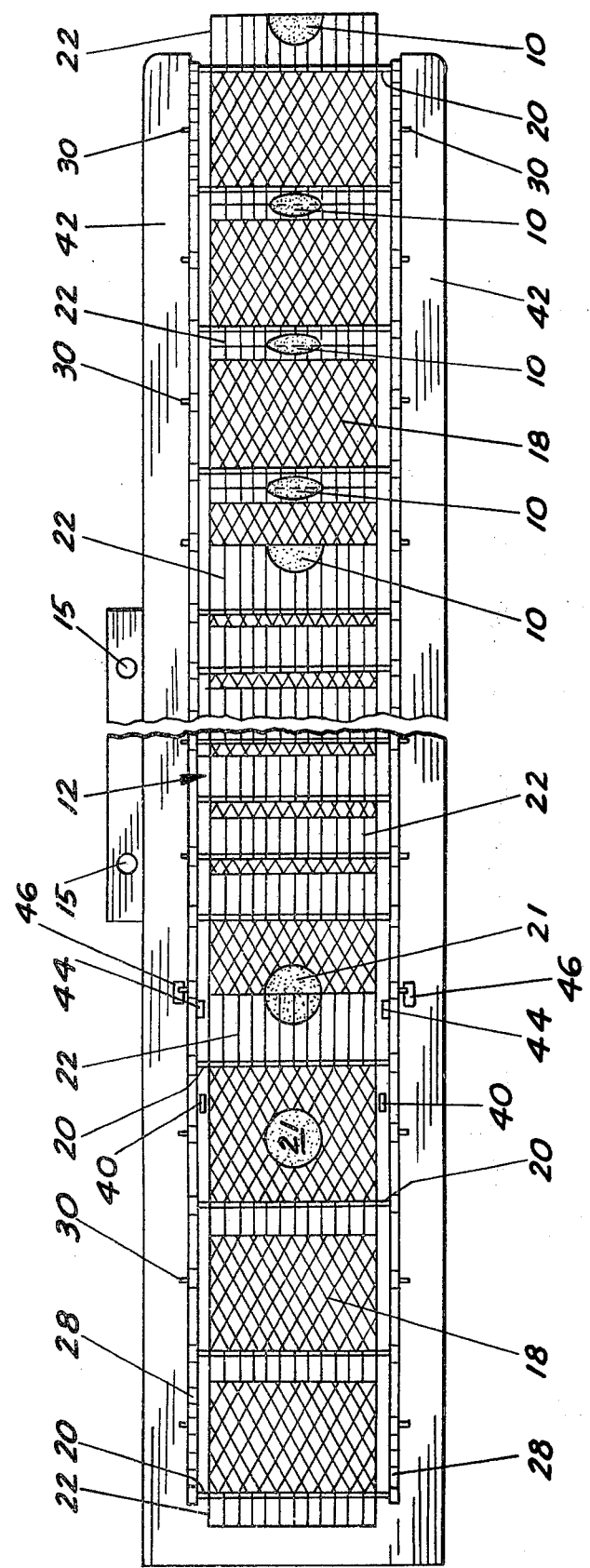
FIG. 5 is a top plan view of the entire machine.

The purpose of this machine is to produce a finished taco shell 10. The taco shell 10 is formed and then fried in vat 12 which contains hot grease heated by heat means 14. Inasmuch as the vat 12 is of conventional structure, it will not be described in detail. I do prefer to use three separate thermostats and submerged electric heaters as a portion of the heat means 14. The control dials 15 for the separate heaters are shown in FIGS. 3 and 5 of the drawing.

Figure 4:
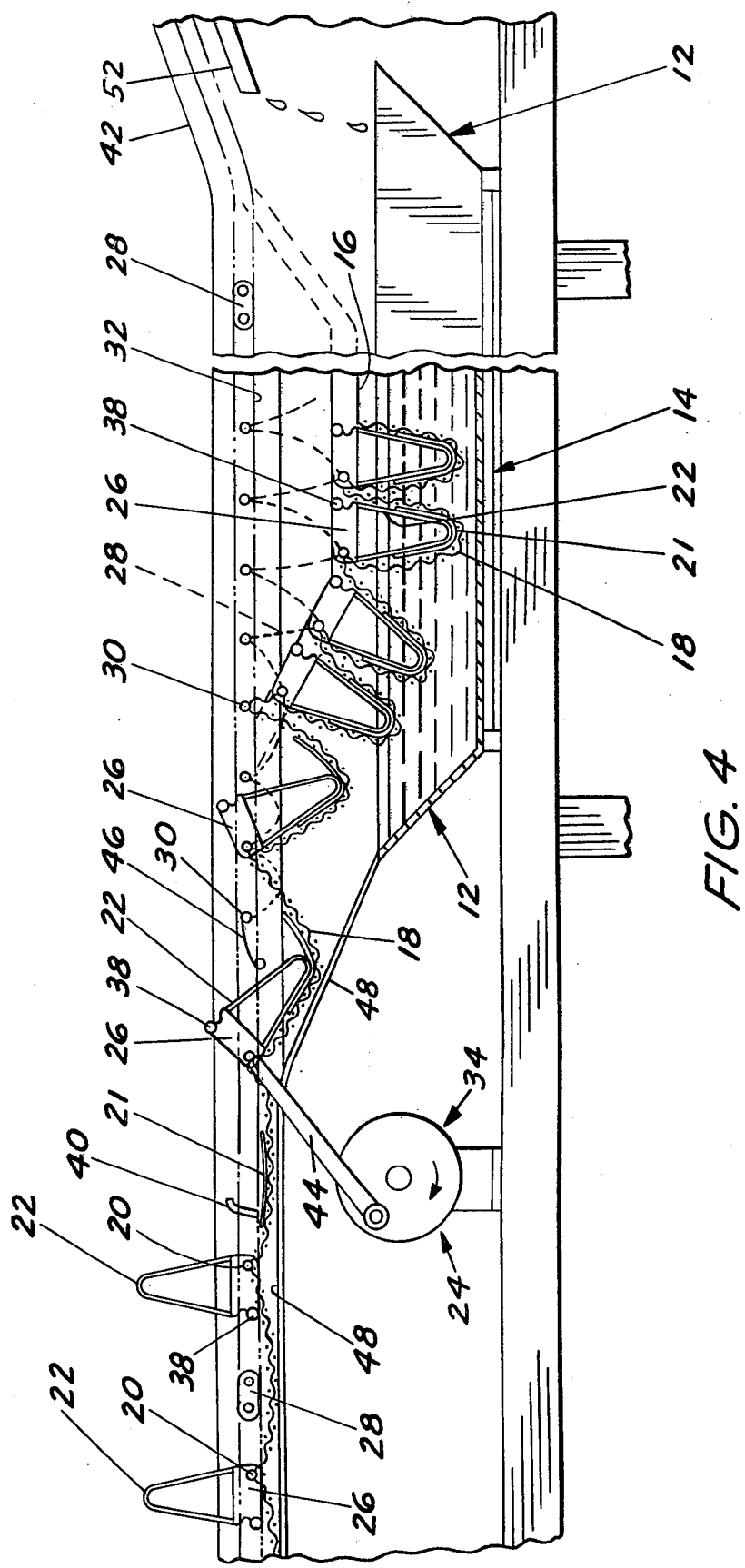
FIG. 4 is a sectional view of the loading and forming portion of the machine.

The vat 12 extends longitudinally. A first set of rails 16 (also called pivot rod rails) extend along each side of the vat 12 just below the level of the grease in the vat. (FIG. 4). The rails 16 support web 18 because the web has regularly spaced transverse pivot rods 20 across it. As stated before, the web 18 is made of woven wire and such woven web is known to the industry. It could be described as a flexible, pliable continuous web, which is perforated, so the food, in this case tortilla 21, is cooked.

The pivot rods 20 also carry plungers 22. The plungers are V-shaped or U-shaped and are made of individual wire loops or V's 23 attached to a header 25 adjacent to the pivot rod 20 and a second bar or header 27 at the opposite end. The headers 25 and 27 are connected to cam plates 26 on each side which would be outboard of the web 18. The cam plates 26 are connected to the rods 20 as illustrated.

Drive chain 28 is connected to the extreme ends of the pivot rods 20. Describing this structure in a different way, it may be said that the pivot rods 20 have the drive chain 28 attached to the extreme ends thereof. Just inside of the connection of the drive chains 28, the pivot rods 20 have the cam plates 26 attached to them and the cam plates have attached thereto headers 25 and 27. The plunger loops 23, forming the plunger 22, are connected to the cam plates 26. Inside of the cam plates 26, the woven web 18 extends along the pivot rod 20. There is a space 29 between the cam plates 26 and the drive chain 28.

Chain pins 30 extend outward from the chain about halfway between where the chain is connected to the pivot rods 20. The chain pins 30, the drive chain 28, and the space 29 on the pivot rods 20, together with other equipment, all form drive means for driving the web and its associated equipment through the machine.

A second set of rails or chain rails 32 extend longitudinally along the vat 12 above and at a wider spacing than the first set of rails 16. The chain pins 30 ride upon the second set of rails 32.

Figure 1:
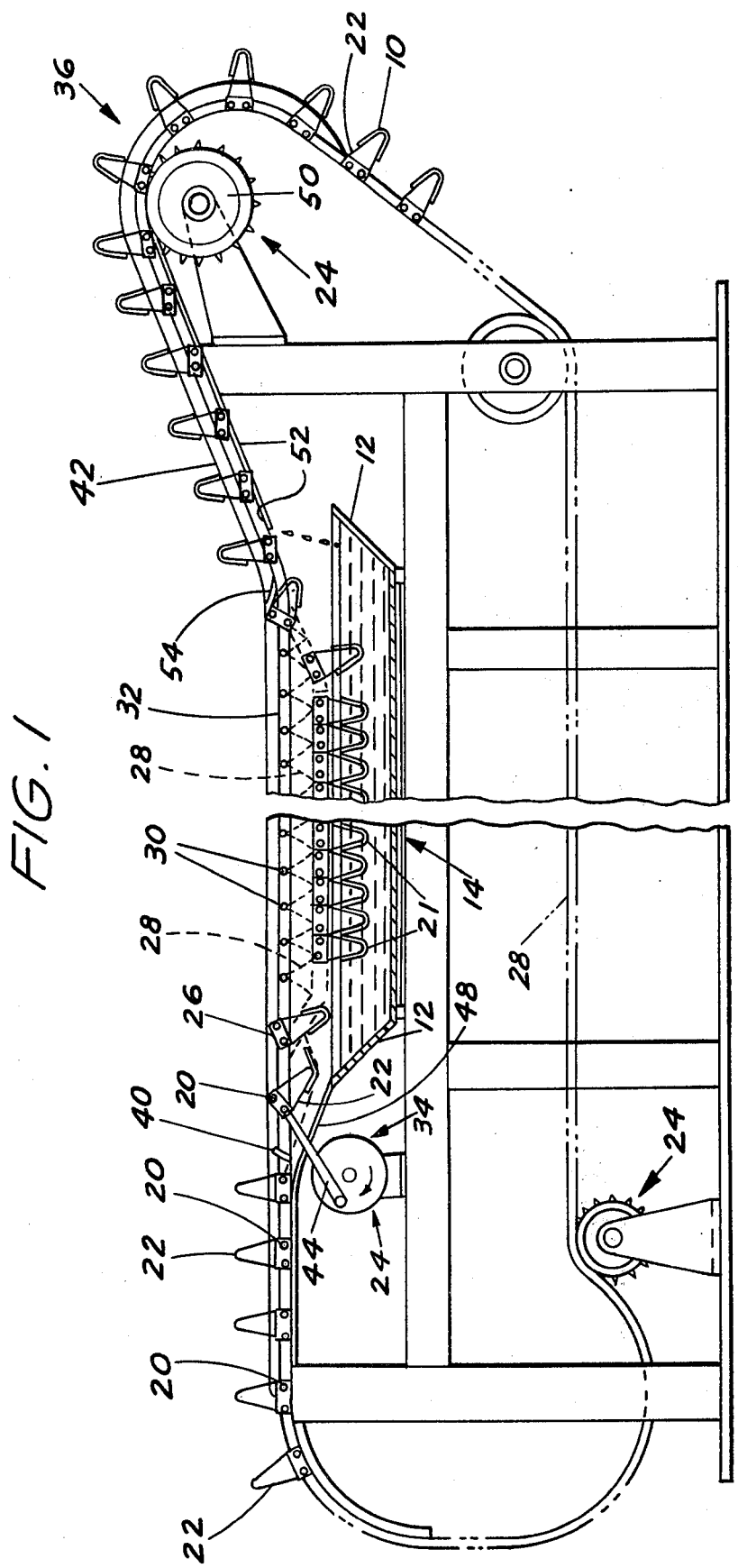
FIG. 1 is a longitudinal schematic sectional view of a machine according to this invention.
Figure 2:
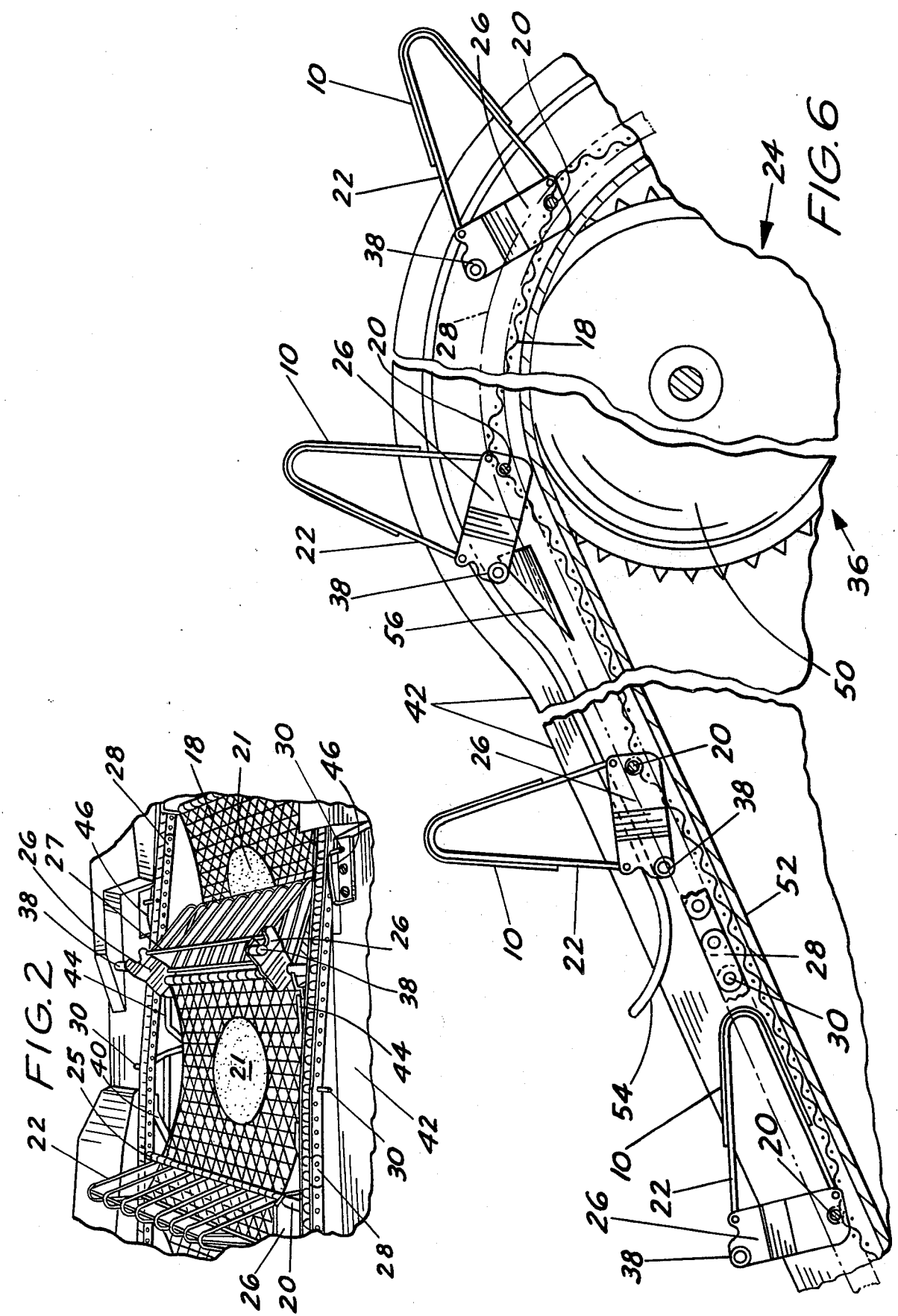
FIG. 2 is a perspective view of the loading portion of the machine.

The cam plates 26 carry a cam roller 38, the location of which may be particularly seen in FIGS. 2 and 6. As stated before, the pivot rod 20 is adjacent to the header 25 and, likewise, the cam rollers 38 are adjacent to the header 27, which is on the opposite end of the cam plate 26. The distance along the drive chain 28, or the web 18, from one pivot rod 20 to the next is a little over twice the height of the plunger 22. Also, the plunger 22 is a little over twice the length of the cam plate 26.

The basic operation of the machine may be described briefly and basically in that the tortilla 21 is placed on the web 18 and the plunger 22 holds the tortilla in place and forms the shape of the tortilla as the web is folded. Describing this process in more detail, the tortilla 21 is placed upon the web about halfway between pivot rods 20. (FIGS. 2, 3, and 5). Although I say that it is placed upon the web by hand, it is contemplated that an automatic machanism for placing the tortilla is to be developed, however, this is another invention. After the tortilla 21 is placed upon the web 18, the web is advanced. As the web is advanced, the plunger 22 is moved from its erect position to a horizontal position by spring recliner cam 40. (FIGS. 1, 2, 3, 4, and 5). The recliner cam 40 is placed upon rail 42 which extends along the machine adjacent to and at the loading station. The recliner cam 40 is placed to strike cam roller 38 to lift the cam roller 38, which is on the trailing side of the cam plate 26, so the recliner cam 40 pushes the trailing side upward which causes the plunger 22 to pivot forward upon the pivot rod 20. The tortilla 21 should be placed upon the web 18 so the end of the plunger 22 is about the center of the tortilla when the plunger 22 is in the down position.

The web 18 at the loading station is moved by push-drive means 34. The push-drive means is a portion of the total drive means 24. It includes a pair of arms 44 which are reciprocated by any convenient mechanism so that the web is advanced one step. The arms 44 push against the portion 29 of the rod 20 between the web 18 and the chain 28. The length of the step will be the distance from one pivot rod 20 to the next. The arms 44 have a notch which engages the space 29 upon the pivot rod 20.

Push catch 46 also is mounted upon the rail 42. However, the push catch is located at wider spacing so it is adaptable to engage the chain pin 30. Because the push catch 46 engages the chain pin 30, it is impossible for the web 18 to move backward and must always move forward. The web 18 is supported at the loading station by support plate 48. This support plate 48 slopes downward on the vat side of the loading station so it leads the web 18 into the vat 12. The web 18 has sufficient length so it is capable of folding as it proceeds through the vat 12. As the web is advanced by the push drive means 34, the web will fold. The first set of rails or pivot rod rails 16 will support the pivot rods and the cam rollers 38. The plunger 22 is now in a depending position emersed in the hot grease in the vat 12 and therefore, the tortilla begins frying into a taco shell 10. The drive chain 28 is supported by the chain pins 30 on rail 32 above the level of rail 16 so the drive chain is not emersed in the hot grease. Although it does no damage for the drive chain 28 to be emersed in the hot grease, the drive chain would, of necessity, be heated to the temperature of the hot grease and after it came out, it would cool; therefore, it would require additional heat to heat the cooled drive chain.

The web 18 with the plungers 22 and the cam plates 26 are pushed through the vat 12 by the push drive means 34. The web 18 is pushed from the loading station to the vat.

On the unloading end of the vat 12, the web 18 is pulled from the vat by the pull drive means 36. This pull drive means 36 includes a sprocket 50 which is mounted at the top of the drain incline 52. The two drive chains 28 are trained over the sprockets 50. As the drive chains 28 are pulled by the sprocket 50 at the top of the drain incline, the web 18 is also pulled because the web and the drive chain are interconnected by the pivot rods 20. As the web 18 is pulled, it straightens and unfolds. The taco shells 10 have not been fried crisp after having passed through the hot grease in the vat 12. The plungers 22 will be lying along the web.

After the plungers with the taco shells on them have been pulled from the vat, the plunger will be erected by erector cam 54 which is mounted upon the side rails of the machine at this area. The erector cams 54 are flat springs which act upon the cam rollers to pivot the cam plates 26 and thus the plungers 22 in a vertical upright position so the grease readily drains from the taco shell. The grease runs from the taco shell along the drain incline 52 and back into the vat 12. Various roughness or additional shaker cams 56 are placed along the sides of the drain incline so the plungers are shaken or flipped, causing the grease to shake off the taco shells 10.

It will be understood that at the end of the run, taco shells 10 fall freely from the plungers 22. It is possible, also, to put additional cams similar to cams 56 to give a little flip to the plunger at the point the shell 10 is flipped from the plunger 22.

Those skilled in the art will understand that if it is desired that the tortilla be fried flat, (e.g., chalupa), a slightly smaller tortilla is placed immediately adjacent to the pivot rods 20 and the plunger 22 will hold them against one of the flat sides rather than bending them in the middle as shown in this embodiment.

After the web, plungers, etc., are pulled from the grease and the taco shells 10 are flipped from the plungers, the web and chain are returned back beneath the vat 12 to the loading station where the process is repeated.

I have not shown the drive mechanisms nor has it been described in detail. It is my opinion that anyone skilled in the art can provide a mechanism for driving the pull drive means 36 at a constant rate of speed and to operate the push drive means 34 so it pushes in a reciprocating motion. Of course, these two drive means 34 and 36 must be timed so the total of the motion of the two is the same. However, because the push drive means 34 is discontinuous, it is necessary that there be a loop in the web 18 and chain 28 somewhere in the return from the unloading station to the loading station. I prefer to form this loop, which will vary in length, at the loading station end of the machine. Since the drives must be timed together, I prefer to use a single electric motor to drive, by chains, the push drive mechanism 34 and the pull drive mechanism 36. There is no particular lost motion between the pull drive mechanism 36 and the return chain beneath the vat, but at the loading end, there is more or less web and chain hanging. The amount hanging will vary according to what portion of the cycle the push mechanism is in.

Also, the push mechanism 34 could drive the chain 28 and web 18 continuously. However, this requires the tortillas 21 to be loaded onto a moving web which is not the preferred embodiment.

Other details of construction such as side plates and framework either have not been shown or only shown schematically inasmuch as I am of the opinion that anyone skilled in the art of building food machinery is able to provide these details of construction without expermentation or inventive effort.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. The method of cooking a plurality of food products which each have a major portion of their respective surface areas disposed substantially parallel to a respective flat plane, the method comprising the steps of:

loading the products on a series of carriers longitudinally spaced from each other at a loading station, moving the loaded carriers together to decrease the space between them and the products on them, disposing the products on the carriers with their respective flat planes in line with and transverse to a substantially horizontal line, advancing the loaded carriers along a substantially horizontal line at the decreased spacing through grease, removing the loaded carriers from the grease, increasing the space between the loaded carriers, and removing the products from the spaced-apart carriers.

* * * * *

UNITED STATES PATENT OFFICE
CERTIFICATE OF CORRECTION

PATENT NO. : 3,928,638
DATED : December 23, 1975
INVENTOR(S) : Daniel T. Stickle It is certified that error appears in the above-identified patent and that said Letters Patent are hereby corrected as shown below:

Column 3, line 18, change "machanism" to --mechanism--; line 58, change "emersed" to --immersed--; line 62, change "emersed" to --immersed--; line 64, change "emersed" to --immersed--.

Column 4, line 14, change "not" to --now--.

Column 5, line 8, change "expermentation" to --experimentation--.

Signed and Sealed this thirtieth Day of March 1976

[SEAL]

Attest:

RUTH C. MASON
Attesting Officer

C. MARSHALL DANN
Commissioner of Patents and Trademarks